(12) United States Patent
Baumgarte et al.

(10) Patent No.: US 10,040,236 B2
(45) Date of Patent: Aug. 7, 2018

(54) MACHINE FOR PRODUCTION OF CONTAINERS FILLED WITH A LIQUID PRODUCT FROM PREFORMS MADE FROM A THERMOPLASTIC MATERIAL

(71) Applicant: KHS Corpoplast GmbH, Hamburg (DE)

(72) Inventors: Rolf Baumgarte, Ahrensburg (DE); Michael Linke, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 15/531,967

(22) PCT Filed: Dec. 21, 2015

(86) PCT No.: PCT/EP2015/002573
§ 371 (c)(1),
(2) Date: May 31, 2017

(87) PCT Pub. No.: WO2016/096145
PCT Pub. Date: Jun. 23, 2016

(65) Prior Publication Data
US 2017/0312975 A1  Nov. 2, 2017

(30) Foreign Application Priority Data

Dec. 19, 2014 (DE) .......................... 10 2014 018 778

(51) Int. Cl.
*B29C 49/46* (2006.01)
*B29C 49/36* (2006.01)
(Continued)

(52) U.S. Cl.
CPC .......... *B29C 49/4215* (2013.01); *B29C 49/36* (2013.01); *B29C 49/46* (2013.01);
(Continued)

(58) Field of Classification Search
CPC . B29C 49/36; B29C 49/46; B29C 2049/4664; B29C 49/4215; B29C 49/6409; B65G 47/847; B67C 3/242
See application file for complete search history.

(56) References Cited

U.S. PATENT DOCUMENTS 4,850,850 A   7/1989  Takakusaki et al.
6,354,427 B1 * 3/2002  Pickel ..................... A23L 3/001
                                                      198/470.1
(Continued)

FOREIGN PATENT DOCUMENTS

DE         10063795 A1    6/2002
DE    10 2010 007 541 A1  6/2011
DE       102012221804 A1 * 5/2014 ........... B65G 47/847

*Primary Examiner* — Robert B Davis
(74) *Attorney, Agent, or Firm* — Rankin, Hill & Clark LLP

(57) ABSTRACT

A machine for producing containers filled with a liquid product from preforms made from a thermoplastic material that includes a heating section (1) for thermal conditioning of the preforms in a drying region (2) of the machine, a molding and filling section (3) for simultaneous molding and filling of the containers within a mold by a filled product inserted into the preform under pressure in a wet region (4) of the machine and transport wheels (5, 6, 7, 8, 10) for transporting the preforms or the molded containers through the machine. A distance of adjacent preforms is smaller in the heating section (1) than in the molding and filling section (3). An enlarging of the distance of adjacent preforms between the heating section (1) and the molding and filling section (3) is performed by a transfer wheel (11) and the drying region (2) is separated from the wet region (4) by a lock (13) having a lock chamber (14). The transfer wheel (11) is arranged in whole or at least in part before the lock (13) in the drying region (2).

6 Claims, 1 Drawing Sheet

(51) Int. Cl.
   *B29C 49/64*   (2006.01)
   *B29C 49/42*   (2006.01)
   *B29L 31/00*   (2006.01)

(52) U.S. Cl.
   CPC .. *B29C 49/6409* (2013.01); *B29C 2049/4664* (2013.01); *B29L 2031/7158* (2013.01)

(56) References Cited

U.S. PATENT DOCUMENTS

| | | | |
|---|---|---|---|
| 6,520,318 B1 * | 2/2003 | Humele | B65G 47/847 198/470.1 |
| 2011/0123666 A1 | 5/2011 | Borgatti et al. | |
| 2012/0266567 A1 | 10/2012 | Haesendonckx et al. | |
| 2015/0069670 A1 * | 3/2015 | Hoellriegl | B29C 49/36 264/535 |

* cited by examiner

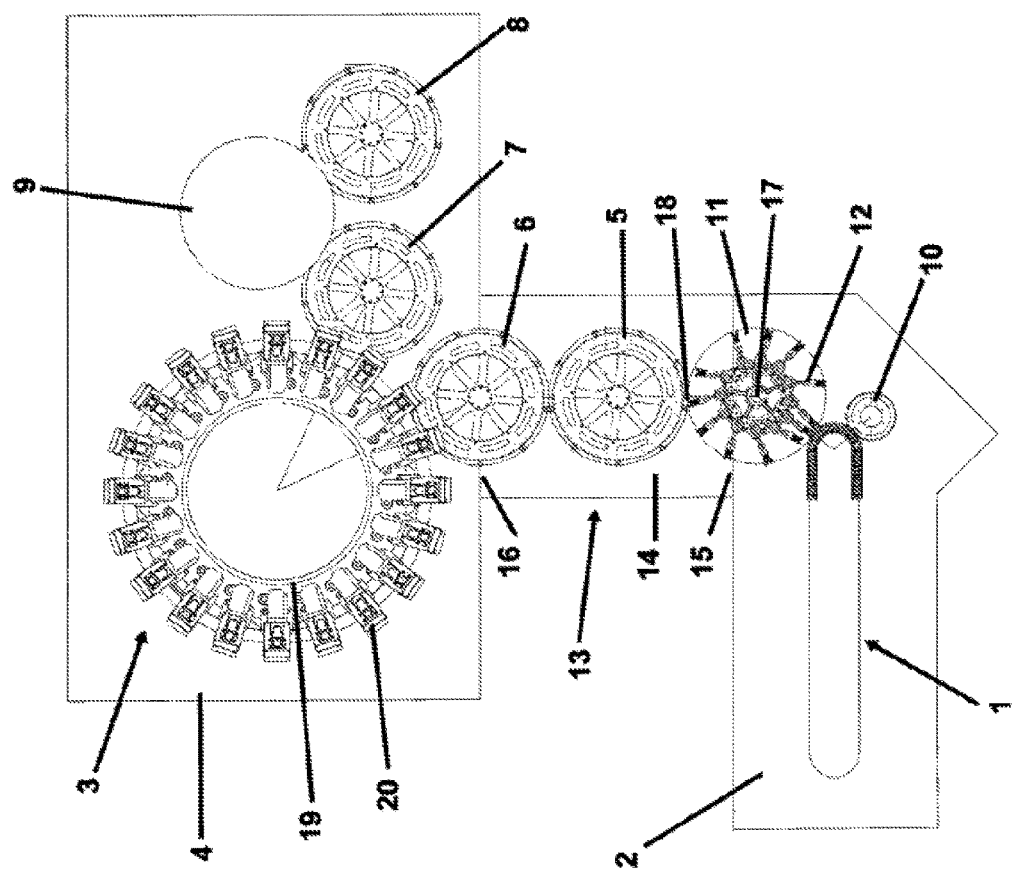

MACHINE FOR PRODUCTION OF CONTAINERS FILLED WITH A LIQUID PRODUCT FROM PREFORMS MADE FROM A THERMOPLASTIC MATERIAL

The present invention relates to a machine for production of containers that are filled with a liquid product from preforms made from a thermoplastic material.

Conventionally, containers, in particular bottles, are molded by a compressed gas entering a preheated preform by means of a blow molding process, and in a second step they are filled with a product, in particular a liquid product. For more efficient production methods have recently been developed in which the preheated preform can be formed and filled in one step by the liquid product fed under pressure rather than by compressed gas. Such a process is known, for example, from DE 10 2010 007 541 A1.

Preforms for the known processes consist of a thermoplastic, for example PET, PE or PP, and are usually produced by means of an injection molding process. For the remolding into containers, it is irrelevant whether the preforms are stored beforehand or are fed to the remolding process immediately after their production.

In order for a preform to be remolded into a container, it is thermally conditioned, i.e., in particular, heated and provided with a suitable temperature profile. In this case, the body of the preform is heated, e.g., to about 120° C., and becomes moldable, while the mouth area can only reach significantly lower temperatures, since the preform is kept at the mouth area in the molding and filling machine and is not allowed to deform under the usual holding forces.

The glass temperature of the commonly used thermoplastic materials, above which the material can be molded free of cracks, is approx. 70° C. This temperature must not be undershot during the entire remolding process.

The preforms or molded containers are transported through the machine on transport wheels having mounts for preforms or containers. There are process wheels, which are, for example, combined with the molding and filling stations or the closing stations of the machine and on which the preform is molded and filled or closed, or pure transport wheels on which the preform or container is transported from one station to the next.

On the process wheel for the molding and filling, a large distance between the individual preforms is required since the molding and filling stations require sufficient space. In thermal conditioning, however, a smaller distance is advantageous since the preforms must be thermally conditioned in a relatively small oven.

The adjustment of the distances is made by transfer wheels, which have either telescopable or pivotable arms. With telescopable arms, the distances between the preforms can be adjusted by extending the arms. If the arms are short, the distance of adjacent preforms is small, if the arms are long, the distance is large. Transfer wheels with pivotable arms have a fixed arm length. The distance can be adjusted by pivoting the arms horizontally.

Both variants have in common that the partially complicated mechanics must be regularly maintained and lubricated.

Bottle filling machines normally have a dry region and a wet region. During the molding and filling of bottles, product losses are encountered again and again, for example by dripped filling material or over-foaming containers, in particular during the pressure relief of carbonated products before the container is closed. The region around the molding and filling stations up to the closure of the bottles is therefore the wet region. The region upstream of the molding and filling stations, in which the preforms are thermally conditioned, should, however, be kept dry.

In the wet region the requirements for the maintenance of the movable machine parts are higher than in the dry region, since the machine must be cleaned and disinfected regularly. Movable parts which come into contact with the filling material must be constructed simple enough to be cleaned safely and quickly.

To prevent the transfer of moisture from the wet region into the drying region such machines usually have a lock with a lock chamber, at the entrance of which the drying region is located and at its outlet the wet region is located.

It is an object of the present invention to propose a machine for the production of containers filled with a liquid product from preforms which is easier to clean and disinfect than the machines known from the prior art.

According to the invention this object is achieved by a machine for production of containers filled with a liquid product from preforms made from a thermoplastic material which comprises a heating section for thermal conditioning of the preforms in a drying region of the machine as well as a molding and filling section for simultaneous molding and filling of the containers within a mold by a filled product inserted into the preform under pressure in a wet region of the machine and transport wheels for transporting the preforms or the molded containers through the machine. The distance of adjacent preforms is smaller in the heating section than in the molding and filling section, and enlarging of the distances of the preforms between the heating section and the molding and filling section is performed by means of a transfer wheel. The drying region of the machine is separated from the wet region of the machine by a lock with a lock chamber. The machine according to the invention is characterized in that the transfer wheel for enlarging the distances of the preforms is arranged in whole or at least in part before the lock.

The transfer wheel for enlarging the distances of the preforms is more complex than the other transport wheels. For example, it may have telescopable and/or pivotable arms. The arrangement according to the invention ensures that the transfer wheel is located in the drying region of the machine and can not be contaminated by filling product from the wet area. The telescopic arms, for example, must be lubricated for trouble-free running of the machine. Filling product adhering to running surfaces would be difficult to clean and would adversely affect the running of the machine.

For the space-saving design of the machine, it is possible to position the transfer wheel in part in the lock chamber for enlarging the distances of the preforms. In the lock chamber immediately behind the entrance on the side of the drying region practically no contamination by filling product occurs. The machine can thus be designed in a space-saving manner and with shorter paths, so that the thermally conditioned preforms can be fed to the molding and filling section as quickly as possible. Preferably, however, the axis of rotation of the transfer wheel for enlarging the distances of the preforms should be arranged outside the lock chamber in the drying region. The transfer point between the transfer wheel and the following transport wheel can advantageously be located in the lock chamber.

Preferably, at least one transport wheel is arranged in whole within the lock chamber. Thus, the transfer wheel is arranged at the entrance of the lock chamber on the side of the drying region, and a transport wheel is arranged at the exit of the lock chamber on the side of the wet area which are not in direct contact with one another. The transport wheel located therebetween, which is arranged in whole in the lock chamber effectively prevents an entry of filling product into the drying region.

The lock chamber can have a plurality of chamber regions which are at least in part separate from one another.

The transfer wheel can, in particular, in the input region have a different spacing than in the output region. Preferably, the spacing in the input region is smaller than in the output region.

A transport wheel preferably has a constant spacing, which corresponds, in particular, to the distance of the molding and filling stations at the molding and filling section, i.e., in particular, the spacing of the molding and filling wheel.

An exemplary embodiment of the invention is explained in more detail below with reference to the accompanying drawing, in which:

FIG. 1 shows schematically the structure of a machine according to the invention for the production of filled containers.

It is self-evident to the person skilled in the art that the drawings shown here are merely intended to illustrate the principle of the invention and are reproduced only schematically and not to scale. In particular, the illustrated dimensions of all elements are only for illustrating purposes. The actual dimensions and size ratios can be freely determined by a person skilled in the art on the basis of his specialist knowledge.

FIG. 1 schematically shows a machine according to the invention for production of containers that are filled with a liquid product from preforms made from a thermoplastic material. The machine comprises a heating section 1 for thermal conditioning of the preforms in a drying region 2 of the machine as well as a molding and filling section 3 along which the preforms are moved on a molding and filling wheel 19. Here, there are a plurality of molding and filling stations 20 for simultaneous molding and filling of the containers within a mold by a filled product inserted into the preform under pressure in a wet area 4 of the machine.

Furthermore, the machine has a plurality of transport wheels 5, 6, 7, 8 for transporting the preforms or molded containers through the machine. Following the molding and filling section 3, the molded and filled containers are transported by means of the transport wheel 7 to a closing station 9 which is not of interest here.

A transport wheel 10 supplies the heating section 1 with preforms. Transport wheels 5, 6, 7, 8, 10 are designed such that the distance of adjacent preforms is smaller in the heating section 1 than in the molding and filling section 3. The preforms which are thermally conditioned at the end of the heating section 1 therefore must be brought to the greater distance required in the molding and filling section 3. For this purpose, a transfer wheel 11 with pivotable arms 12 is used. Such wheels are generally known. Alternatively, a transfer wheel with telescopic arms could also be used, which changes the radius of the arms during a rotation of the wheel by means of a curve control, so that shorter distances are obtained for short arms and longer distances between adjacent preforms are obtained for long arms.

A lock 13 with a lock chamber 14 is provided for separating the drying region 2 from the wet region 4 of the machine. The machine components are arranged in such a way that the axis of rotation 17 of the complex transfer wheel 11 is located in the drying region and the transfer wheel 11 runs only in part in the lock chamber 14 immediately behind its inlet 15. The transport wheel 5 is located in whole within the lock chamber so that the transfer point 18 between the transfer wheel 11 and the transport wheel 5 is also located in the lock chamber 14. The transport wheel 5 transfers the supplied preforms to the transport wheel 6, which in turn runs in part in the lock chamber 14 and in part in the wet region 4 behind the outlet 16 of the lock chamber 14. A carry-over of filling product from the wet region 4 into the drying region 2 is thus practically excluded. The complex transfer wheel 11 can not be contaminated with filling product. Cleaning and maintenance are greatly simplified.

The invention claimed is:

1. A machine for producing containers filled with a liquid product from preforms made from a thermoplastic material, comprising:
   a heating section for thermally conditioning the preforms in a drying region of the machine;
   a molding and filling section for simultaneous molding the preforms into containers and filling the containers within a mold by a filled product inserted into the preform under pressure in a wet region of the machine, and
   transport wheels for transporting the preforms or the molded containers through the machine;
   wherein a distance of adjacent preforms is smaller in the heating section than in the molding and filling section,
   wherein an enlarging of the distance of adjacent preforms between the heating section and the molding and filling section is performed by means of a transfer wheel,
   wherein the drying region of the machine is separated from the wet region of the machine by a lock having a lock chamber,
   wherein the transfer wheel for enlarging the of adjacent preforms is arranged in whole or at least in part before the lock in the drying region.

2. The machine according to claim 1, wherein the transfer wheel has telescopable and/or pivotable arms for enlarging the distance of adjacent preforms.

3. The machine according to claim 1, wherein a transfer point between the transfer wheel and a following transport wheel is located in the lock chamber.

4. The machine according to claim 1, wherein the transfer wheel is arranged in part within the lock chamber.

5. The machine according to claim 1, wherein an axis of rotation of the transfer wheel is arranged outside the lock chamber.

6. The machine according to claim 1, wherein at least one transport wheel is arranged in whole within the lock chamber.

* * * * *